United States Patent [19]

Fritz et al.

[11] Patent Number: 5,080,009
[45] Date of Patent: Jan. 14, 1992

[54] ROUND BALER HAVING TRASH DISCHARGE MECHANISM

[75] Inventors: David P. Fritz; Ferol S. Fell, both of Newton; Howard J. Ratzlaff, Hesston, all of Kans.

[73] Assignee: Hay & Forage Industries, Hesston, Kans.

[21] Appl. No.: 592,555

[22] Filed: Oct. 4, 1990

[51] Int. Cl.$^5$ .................. B30B 5/06; A01D 39/00
[52] U.S. Cl. ........................... 100/88; 56/341; 198/498
[58] Field of Search .............. 100/5, 87, 88, 89, 102, 100/94, 98 R; 198/494, 498; 56/341-344

[56] References Cited

U.S. PATENT DOCUMENTS

| | | | |
|---|---|---|---|
| 667,551 | 2/1901 | Morenus | 198/498 |
| 975,176 | 11/1910 | Stroud | 198/498 X |
| 1,858,736 | 5/1932 | Haugh | 198/498 X |
| 4,914,900 | 4/1990 | Viaud | 100/88 X |

FOREIGN PATENT DOCUMENTS

| | | | |
|---|---|---|---|
| 2264743 | 10/1975 | France | 198/498 |
| 2575362 | 7/1986 | France | 100/88 |

Primary Examiner—Philip R. Coe
Assistant Examiner—Stephen F. Gerrity
Attorney, Agent, or Firm—Hovey, Williams, Timmons & Collins

[57] ABSTRACT

An apparatus for forming large round bales of crop material includes a frame (10) having a pair of side walls (12, 14) and ground engaging wheels (18) mounted on the frame for supporting the apparatus for movement across the ground. A plurality of rollers (24, 26, 28, 30, 32, 34, 36, 38) are mounted for rotatable movement relative to the frame (10) and extend between the side walls (12, 14), and a plurality of endless bale forming belts (46) are trained about the rollers to define a bale forming chamber (16) in which large round bales of crop materials are formed. At least one additional chamber (48) is also defined by the bale forming belts (46) adjacent the bale forming chamber (16). A clean-out assembly (54) is provided for cleaning crop material from the additional chamber. The clean-out assembly (54) includes an opening (64) in one of the side walls (12) of the baler and a clean-out belt mounted on a pair of pulleys (56, 58) for sweeping crop material in a direction toward the opening in the side wall so that material within the additional chamber (48) is swept from the apparatus through the opening (64).

10 Claims, 3 Drawing Sheets

ROUND BALER HAVING TRASH DISCHARGE MECHANISM

BACKGROUND OF THE INVENTION

1. Field of the Invention

The present invention relates generally to rotary crop balers and, more particularly, to a rotary baler having a clean-out assembly disposed within a chamber adjacent the bale forming chamber for removing crop material from the apparatus which inadvertently enters the chamber during baling.

2. Discussion of the Prior Art

In an apparatus for forming large round bales of crop material, it is known to provide a frame having a pair of side walls and a number of rollers extending between the side walls and adapted to accommodate a plurality of parallel bale forming belts which together define a continuous web. This web extends along a travel path trained about the rollers and circumscribing a bale forming chamber and at least one additional chamber adjacent the bale forming chamber.

During a baling operation, the path followed by the web within the frame of the baler changes in dependence upon the size of the bale in the forming chamber such that the size of the forming chamber grows while the additional chamber is reduced in size. Because the web is typically defined by a plurality of spaced side-by-side belts, during this expansion of the forming chamber some crop material delivered to the chamber gets between the belts and falls into the additional chambers adjacent the forming chamber.

Numerous problems are created as a result of the accumulation of crop material in the additional chamber. For example, because of the orientation of the web about the rollers in the baler, most of the rollers are disposed within the additional chamber and must be permitted to make continuous gripping contact with the belts in order to carry out movement of the belts along the travel path of the web. However, when crop material is permitted to accumulate within the additional chamber, the material gets caught in the rip formed between the belts and any rollers located near the lower end of the chamber, and the cooperation between the belts and rollers is adversely effected.

Further, when crop material is permitted to become interposed between the rollers and at least some of the belts, it is possible that the belts will move in a direction along the length of the rollers relative to the other belts and will perhaps overlap adjacent belts thus creating larger gaps through which crop material may escape the bale forming chamber.

OBJECTS AND SUMMARY OF THE INVENTION

It is an object of the present invention to provide a baler in which a clean-out assembly is provided for cleaning crop material from at least one additional chamber located adjacent the bale forming chamber of the baler such that material is prevented from accumulating in the additional chamber.

Further, it is an object of the invention to provide a baler in which such a clean-out assembly is located within the at least one additional chamber in an area immediately above at least one roller disposed within the chamber such that the clean-out assembly prevents material from clogging the space defined between the roller and a plurality of web defining belts trained about the roller.

In accordance with one aspect of the invention, a baler includes a frame having a pair of side walls, a pair of ground engaging wheels mounted on the frame for supporting the frame for movement along the ground, and a plurality of rollers mounted for rotatable movement relative to the frame and extending between the side walls. At least one endless bale forming belt is trained about the rollers to define a bale forming chamber in which large round bales of crop material are formed, and to define at least one additional chamber adjacent the bale forming chamber. Clean-out means are provided for cleaning crop material from the at least one additional chamber. The clean-out means includes an opening in one of the side walls of the baler and sweeping means for sweeping crop material in a direction toward the opening in the side wall so that the material is swept from the at least one additional chamber through the opening.

By providing the clean-out means within the at least one additional chamber in an area overlying at least one of the rollers, it is possible to prevent crop material from accumulating within the chamber and from getting between the rollers and the bale forming belts in amounts sufficient to cause undesirable shifting of the belts along the rollers. Thus, it is possible to operate the baler for extended periods without having to stop production of the crop bales to clean out the material accumulating within the additional chamber.

Further, less crop material is permitted to escape the bale forming chamber due to the maintenance of proper orientation of the bale forming belts relative to one another as insured by the clean-out means which prevents crop material from interfering with the cooperation between the bale forming belts and the rollers within the additional chamber.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENT

Figure 1:
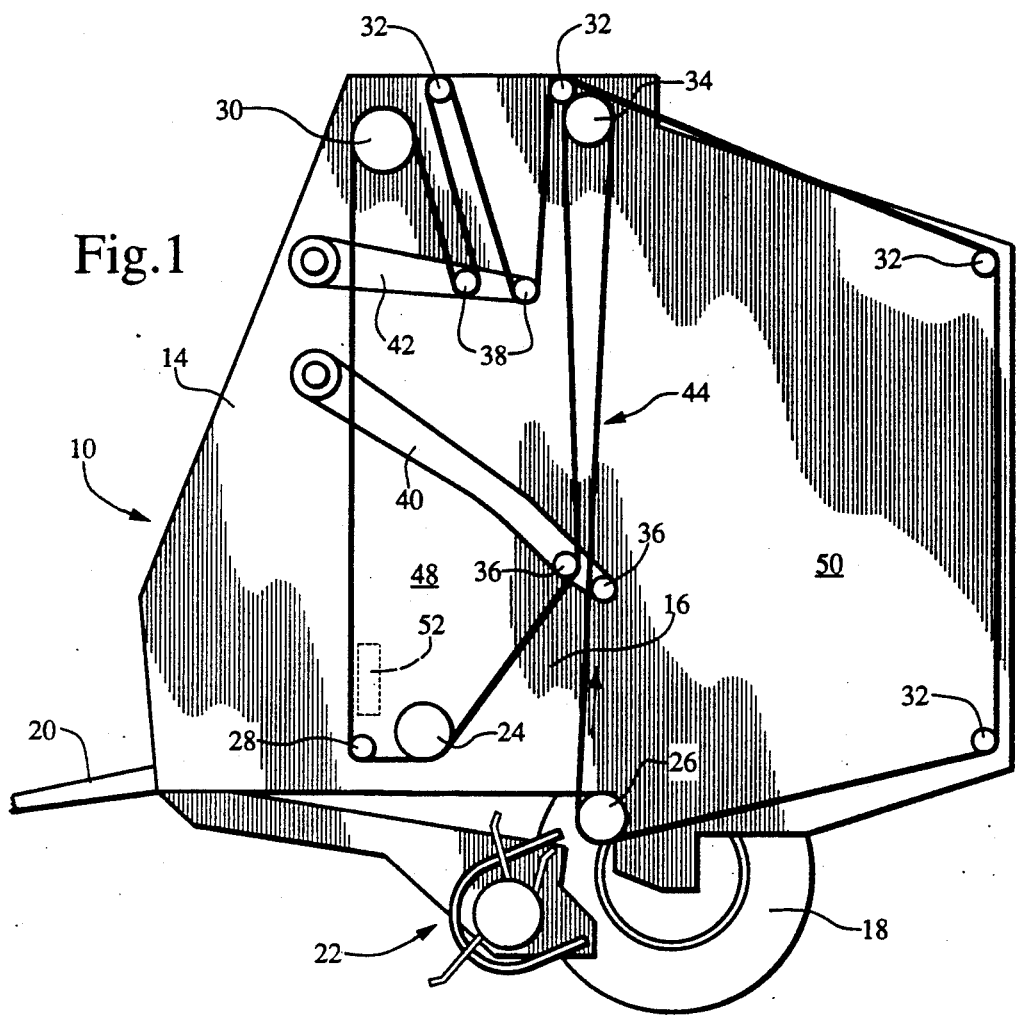
FIG. 1 is a schematic side elevational view of a rotary baler incorporating the clean-out assembly of the present invention, with the near sidewall of the baler removed to reveal details of construction.

Referring initially to FIG. 1, a baler is illustrated which includes a pair of laterally spaced-apart sidewalls 12, 14, only one of which is shown in FIG. 1, that cooperate to provide the lateral extremities of a bale forming chamber 16. The sidewalls 12, 14 are carried on a suitable chassis or frame 10 which is in turn carried by a pair of ground engaging wheels 18 located on opposite sides of the baler outboard of the respective sidewalls.

A fore-and-aft extending tongue 20 located adjacent the front end of the baler relative to its normal direction of travel adapts the baler to be hitched behind a towing tractor or the like for advancement across a field having windrowed crop material deposited thereon. A pickup assembly 22 is spaced rearwardly of the front extremity of the sidewalls 12, 14 and is located substantially directly beneath the chamber 16 so as to be operable to pick up windrowed crop material from the field and feed such material up into the chamber through an entrance defined between a transversely extending forward roller 24 and a rear roller 26, both of which span the sidewalls of the baler.

Also spanning the sidewalls 12, 14 are a plurality of additional rollers, including a forwardmost roller 28, an upper roller 30, circumferential rollers 32, central roller 34, limiting rollers 36, and tensioning rollers 38. The rollers 24, 26, 28, 30, 32, 34 are mounted for rotation relative to the side walls but are not movable in a direction transverse to their axes, while the limiting rollers 36 and tensioning rollers 38 are supported on arms 40, 42 such that the rollers 36, 38 are movable in a direction transverse to their axes.

A continuous web 44 is defined by a plurality of parallel, side-by-side bale forming belts 46 which pass around the rollers 24, 26, 28, 30, 32, 34, 36 in a manner as illustrated in FIG. 1, and which are trained about the tensioning rollers 38 such that the path followed by the belts may be varied during formation of a bale in the bale forming chamber to accommodate the increasingly larger bale being formed. For example, as a bale within the chamber 16 increases in size, the arms 40, 42 move upward relative to the baler permitting outward movement of the belts in the region of the bale forming chamber. At the same time as the arm 40 is moving upward to accommodate the bale in the forming chamber, the arm 42 moves upward to maintain the tension in the forming belts while permitting expansion of the forming chamber.

In addition to defining the bounds of the bale forming chamber 16, the web 44 also defines a forward chamber 48 and a rear chamber 50, both of which neighbor the forming chamber. The forward and rear chambers 48, 50 accommodate the increase in size of the forming chamber 16 by permitting expansion of the web 44 into the spaces above the forward and rear rollers 24, 26.

During a baling operation, crop material is delivered to the bale forming chamber 16 and is formed by the belts 46 into a large round bale which is later bound by twine or the like and dumped from the baler in a conventional manner, e.g. by lifting the rear portion of the frame 10 relative to the forward portion and permitting the bale to roll from the baler onto the ground. Because the web 44 is defined by the plurality of side-by-side belts 46, some of the material gets between the belts and falls into the additional chambers 48, 50 adjacent the bale forming chamber 16. As mentioned above, numerous problems arise as a consequence of this material being allowed to accumulate at least in the forward chamber 48.

In order to avoid such accumulation of crop material in the forward chamber 48, a clean-out means in the form of a clean-out assembly 54 is provided in a suitable location, e.g. as illustrated by the dashed line 52 in FIG. 1. A clean-out assembly of similar construction could also be provided in the rear chamber 50 if accumulation of material in the rear chamber is a problem. However, because the buildup of material in the front chamber 48 presents the most significant problems, only a clean-out assembly for use in the forward chamber is discussed with reference to the preferred embodiment.

Figure 2:
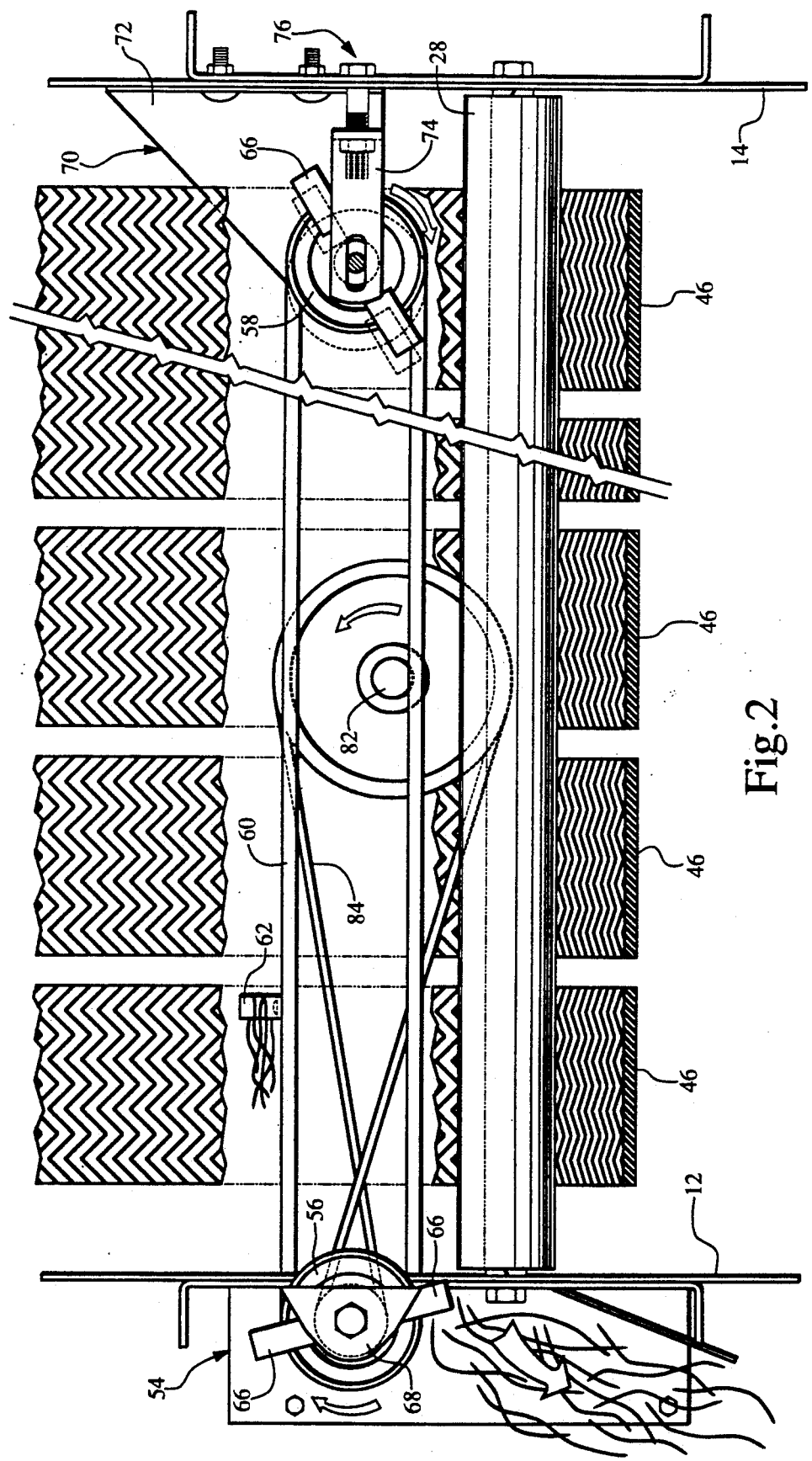
FIG. 2 is a sectional view, partially cut away, of the clean-out assembly viewed from within the area of the baler to be cleaned.

The clean-out assembly 54 is shown in detail in FIG. 2, and includes a pair of pulleys 56, 58, each mounted to one of the side walls 12, 14 for rotation about an axis extending in a direction transverse to the longitudinal axis defined by the forwardmost roller 28. An endless clean-out belt 60 is trained about the pulleys 56, 58 for movement along upper and lower belt runs extending across the top of the forwardmost roller 28, and is provided with at least one upstanding tooth 62 which travels with the belt and works with the belt in moving material along the roller toward the pulleys. The pulley 56 located at the end of the lower run of the belt 60 is disposed within an opening 64 in the side wall 12 of the baler such that material swept to that pulley is delivered from the forward chamber 48 to a region outside the side walls 12, 14.

The pulleys 56, 58 are similar to one another and include a plurality of radially extending cutting blades 66 extending outward beyond the circumference thereof. These blades 66 are provided to cut and chop crop material which is swept toward the pulleys 56, 58 by the clean-out belt 60 and the at least one tooth 62 so that the material may be more easily removed from within the chamber 48. For example, by chopping the material into smaller fragments, the material is permitted to fall through the gaps between adjacent belts 46 and is more easily moved by the belt 60 and tooth 62 toward the pulley 56 mounted adjacent the opening 64 in the side wall 12 of the baler.

Each of the pulleys 56, 58 includes a V-shaped, circumferential groove, not shown, in which the belt 60, which also includes a V-shaped cross-section, is received. This arrangement insures that the belt 60 is maintained in a proper orientation relative to the pulleys 56, 58 with the tooth 62 protruding radially outward as it passes over each of the pulleys.

Figure 4:
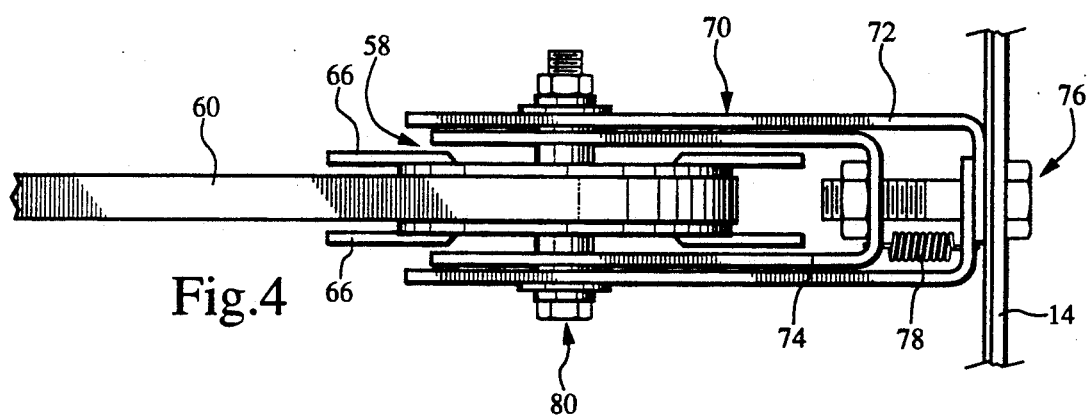
FIG. 4 is a top plan view of a pulley of the clean-out assembly and the mounting bracket assembly used to mount the pulley to one of the side walls of the baler.

The pulley 56 mounted in the opening 64 is supported on the side wall 12 by a bracket 68 secured to the side wall 12. The other pulley 58 is supported on the opposed side wall 14 by a bracket assembly 70 including an outer bracket 72 secured to the side wall 14 and an inner bracket 74 which is shown in detail in FIG. 4, and is movable relative to the outer bracket and the side wall 14. The inner bracket 74 is generally U-shaped, including a hole in the central leg thereof for receipt of a bolt and nut assembly 76 which permits adjustment of the range of motion of the inner bracket 74 relative to the outer bracket 72. One or more tension springs 78 may be provided between the inner and outer brackets for biasing the inner bracket 74 toward the side wall 14 such that the pulley 58 tensions the clean-out belt 60 to a desired tension during movement of the pulley within the preset range of motion defined by the bolt and nut assembly 76. An additional bolt and nut assembly 80 is provided to support the pulley 58 on the inner bracket 74 for rotational movement relative thereto and to maintain the orientation of the inner bracket relative to the outer bracket 72. The bolt and nut assembly 80 also permits the inner bracket 74 to be secured to the outer bracket 72 when it is not desired to provide a tensioning device in the assembly 70.

Figure 3:
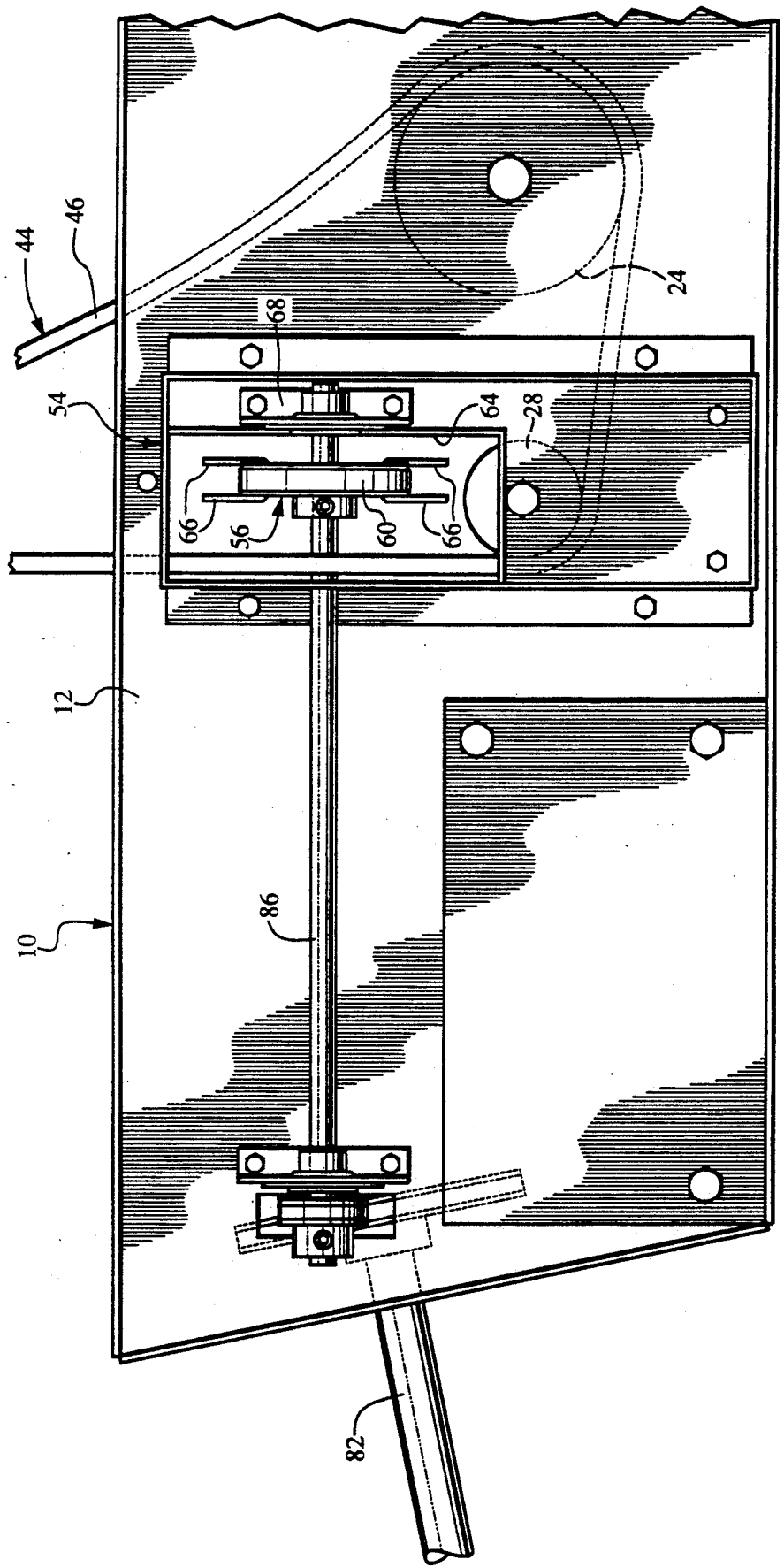
FIG. 3 is a partial side elevational view of the baler illustrating the mounting arrangement of the clean-out assembly of the present invention.

Returning to FIG. 2, a drive means is illustrated for driving the assembly. As shown in FIG. 3, the drive means includes a main drive shaft 82 of the baler, which is connected to the pulley 56 by an endless drive belt 84 connected between the drive shaft and a secondary shaft 86 secured to the pulley for rotation therewith. The drive shaft 82 is angled slightly relative to the secondary shaft 86 to permit the belt 84 to cross over itself at a position intermediate the drive shaft and the secondary shaft such that the pulley 56 is driven in a direction bringing the tooth 62 toward the pulley as the tooth travels along the lower belt run adjacent the forwardmost roller 28. In this manner, a majority of the crop material swept by the belt 60 and tooth 62 is moved toward the opening 64 in the side wall 12 of the baler.

In operation, when the bale forming chamber 16 is empty, such as at the beginning of a baling cycle, the components of the baler are disposed as shown in FIG. 1. As the baler advances along a crop windrow, the pick-up 22 lifts the crop material off of the ground and feeds it through the entrance into the chamber 16 where it is acted upon by the oppositely moving, generally vertically directed belt runs of the belts 46 so as to cause the introduced material to tumble and coil up into a bale and exert radially outward directed forces against the belts. These outward forces cause outward movement of the belts and upward movement of the arm 40 which together define the increase in size of the baling chamber.

During formation of the bale, some material is able to work between the belts 46 and to fall to the lower area of the forward chamber 48 adjacent the forward rollers 24, 28. This material, if not removed, could cause various problems as discussed in the background of the invention above. However, the clean-out assembly 54 of the present invention prevents the material from collecting in the forward chamber 48 by providing means for removing the material from the chamber. Specifically, once the material enters the forward chamber, it is swept by the belt 60 and by the at least one tooth 62 carried on the belt toward one of the pulleys 56, 58. Once the material reaches one of the pulleys 56, 58, the blades 66 on the pulley chop the material into fragments, some of which may be small enough to fall back through the gaps defined between the belts 46. Any material which remains in the forward chamber 48 continues to be moved along the lower run of the clean-out belt toward the pulley 56 adjacent the opening 64 such that the material is swept from the chamber to a region outside the side walls 12, 14.

Although the invention has been described with reference to the preferred embodiment illustrated in the attached drawing, it is noted that equivalents may be employed and substitutions made herein, without departing from the scope of the invention as recited in the claims.

What is claimed is:

1. An apparatus for forming large round bales of crop material, the apparatus comprising:
    a frame including a pair of side walls;
    at least one ground engaging wheel mounted on the frame for supporting the frame for movement;
    a plurality of rollers mounted for rotatable movement relative to the frame and extending between the side walls;
    at least one endless bale forming belt trained about the rollers to define a bale forming chamber in which large round bales of crop material are formed, and at least one additional chamber adjacent the bale forming chamber; and
    clean-out means for cleaning crop material from the at least one additional chamber, the clean-out means including an opening in one of the side walls of the baler and sweeping means for sweeping crop material in a direction toward the opening in the side wall so that the material is swept from the at least one additional chamber through the opening,
    the sweeping means including an endless clean-out belt and first and second pulleys each mounted on one of the side walls of the frame for rotation about an axis extending in a direction transverse to the rollers,
    the clean-out belt extending around the pulleys and including at least one tooth protruding from the clean-out belt such that as the clean-out belt travels around the pulleys the at least one tooth travels along with the clean-out belt to assist in carrying crop material toward the pulleys, and
    the first pulley being mounted at the opening so that material swept toward the first pulley by the clean-out belt and the at least one tooth is delivered from the additional chamber.

2. The apparatus as recited in claim 1, wherein the clean-out means includes drive means for rotating at least one of the pulleys to carry out movement of the clean-out belt.

3. The apparatus as recited in claim 1, wherein at least one of the pulleys includes a radially extending cutting blade mounted for rotation with the pulley such that the cutting blade cuts and chops crop material which is swept toward the pulley by the clean-out belt and the at least one tooth carried on the belt.

4. The apparatus as recited in claim 3, wherein each of the pulleys are provided with a plurality of radially extending cutting blades for cutting and chopping crop material swept toward the pulleys by the clean-out belt and the at least one tooth carried on the belt.

5. The apparatus as recited in claim 1, wherein the clean-out means is positioned within the at least one additional chamber immediately above one of the rollers such that crop material is swept from the additional chamber to prevent the crop material from interfering with the movement of the at least one bale forming belt around the one roller.

6. In a baler for forming large round bales of crop material, the baler including a pair of side walls, a bale forming chamber, bale forming means for forming a bale within the bale forming chamber, and at least one additional chamber located outside the bale forming chamber, the improvement comprising:
    clean-out means for cleaning crop material from the at least one additional chamber, the clean-out means including an opening in one of the side walls of the baler and sweeping means for sweeping crop material in a direction toward the opening in the side wall so that the material is swept from the at least one additional chamber through the opening,
    the sweeping means including an endless clean-out belt and first and second pulleys each mounted for rotation on one of the side walls of the frame,
    the clean-out belt extending around the pulleys and including at least one tooth protruding from the clean-out belt such that as the clean-out belt travels around the pulleys the at least one tooth travels along with the clean-out belt to assist in carrying crop material toward the pulleys, and
    the first pulley being mounted at the opening so that material swept toward the pulley by the clean-out belt and the at least one tooth is delivered from the additional chamber.

7. The apparatus as recited in claim 6, wherein the clean-out means includes drive means for rotating at least one of the pulleys to carry out movement of the clean-out belt.

8. The apparatus as recited in claim 6, wherein at least one of the pulleys includes a radially extending cutting blade mounted for rotation with the pulley such that the cutting blade cuts and chops crop material which is swept toward the pulley by the clean-out belt and the at least one tooth carried on the belt.

9. The apparatus as recited in claim 8, wherein each of the pulleys are provided with a plurality of radially extending cutting blades for cutting and chopping crop material swept toward the pulleys by the clean-out belt and the at least one tooth carried on the belt.

10. The apparatus as recited in claim 6, wherein the clean-out means is positioned within the at least one additional chamber immediately above one of the rollers such that crop material is swept from the additional chamber to prevent the crop material from interfering with the movement of the at least one bale forming belt around the one roller.

* * * * *